Patented Dec. 30, 1952

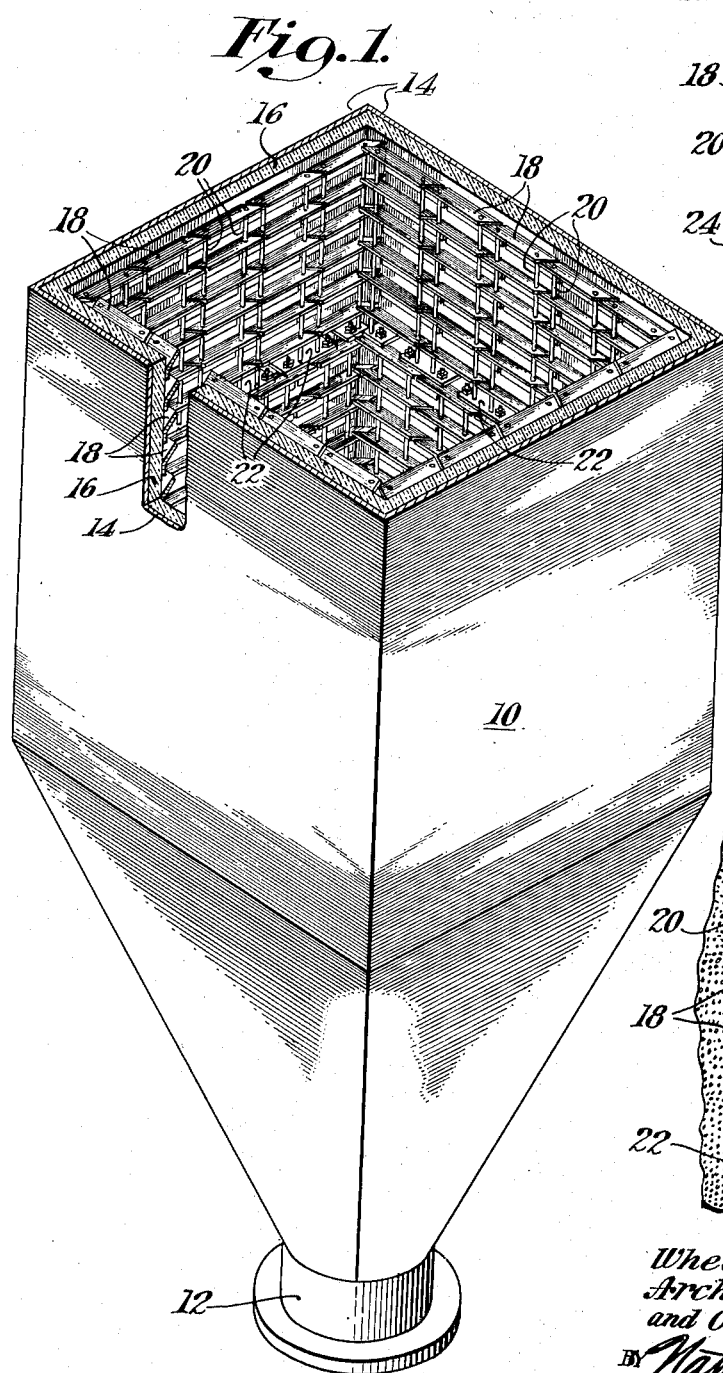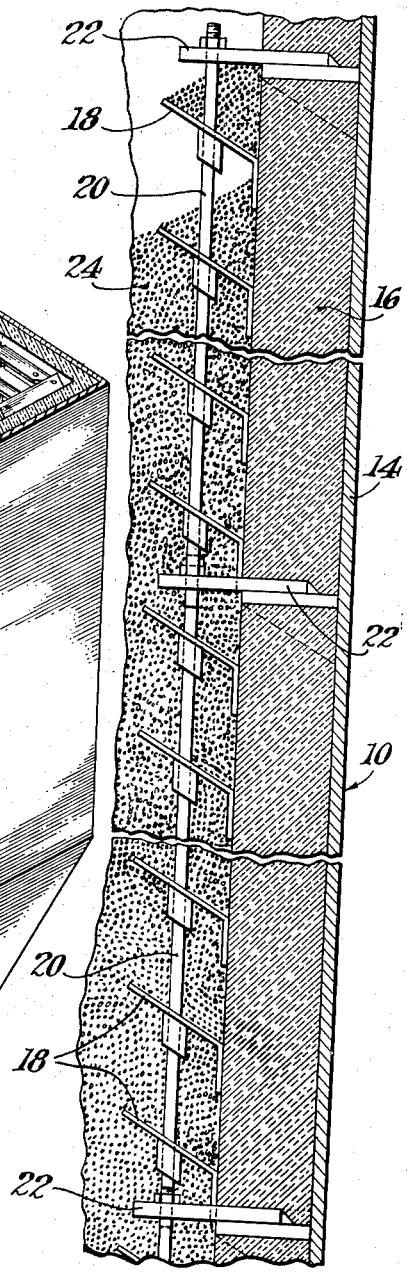

2,623,810

UNITED STATES PATENT OFFICE 2,623,810

KILN WITH PROTECTING WALL STRUCTURE

Wheaton W. Kraft, Scarsdale, N. Y., Archibald Davies, Lyndhurst, N. J., and Otto C. Schauble, Mount Kisco, N. Y., assignors to The Lummus Company, New York, N. Y., a corporation of Delaware Application June 18, 1947, Serial No. 755,346

5 Claims. (Cl. 23—1)

1

This invention relates to improvements in the construction of vertical ducts or chambers and more particularly it relates to improvements in the construction of catalyst regeneration chambers or kilns.

In the process of hydrocarbon conversion of gas oil vapors to produce gasoline and in many chemical reactions it has been customary to utilize a granular or powdered contact material to bring about the desired reaction. When the contact material is of a catalytic nature, beneficial results are obtained but it is found that as the operation continues the catalyst becomes contaminated or fouled as with carbon and must be regenerated or revivified by oxidation of such deposit. As a result, the regeneration chamber or kiln is subjected to rather high temperatures of operation and, in view of the very large volumes of contact material that are continually passed through the kiln, the preferred apparatus has been extraordinarily heavy and complicated. It is, of course, necessary to have a very substantial thickness of insulating wall to prevent heat loss and destruction of the unit and the movement of the contact material especially of the granular type has caused attrition which makes it necessary to replace the lining at frequent intervals.

The principal object of our invention is to provide an improved form of kiln for the regeneration of gravity flowing beds of contact material in which the kiln is reduced in weight, is provided in an improved manner with a secondary insulating wall, and is made in such a manner as to have a longer life and a lower initial cost of construction.

More generally, it is an object of our invention to provide means whereby a granular material will become pocketed along the inner wall of a chute or vessel through which such material flows, and thereby form of the material a secondary wall providing a desired heat insulation and resistance to attrition.

More specifically, it is the object of the invention to provide a series of inwardly and upwardly inclined flights or shelves in a kiln through which a granular contact mass passes whereby a limited portion of the contact material which normally passes down the walls will be prevented from flowing and caused to form a stagnant surface adjacent the wall.

Further objects and advantages of our invention will appear from the following description of the preferred form of embodiment thereof as shown in the attached drawing illustrative thereof and in which,

2

Figure 1 is a sectional perspective view of a portion of a kiln embodying the invention, and Figure 2 is a substantially vertical cross-section through a part of the wall of the kiln shown in Figure 1.

The kiln shown in Figure 1 and generally indicated at 10 may be of a suitable hollow shape such as round, square or of other geometrical cross-section having such an enlarged section so as to permit a continuous flow of granular material through the kiln and out the outlet generally indicated at 12. The kiln has a structural supporting wall generally indicated at 14 and a lining 16 of high temperature insulating blocks. As a specific application of our invention, the kiln is shown as the catalyst regenerating unit in which the carbonaceous deposit formed on the contact material is burned off by the admission of air in a well-known manner. As an example of such a unit, one that is approximately 10 feet square in cross-section is adapted to handle approximately 100 tons per hour of a granular catalyst, as for example, of the type of natural or synthetic catalyst which may have a mesh size from ¼" to number 80. The temperatures in such a kiln run in the neighborhood of about 900–1200° F., the temperature being limited by control of air admitted in the well-known manner.

A common wall construction employed in such a kiln includes an outer layer directly inside of the shell and formed of insulating blocks, and an inner layer or facing of tile supported by suspension. The thickness of the said outer layer is sometimes as great as 5 inches, in order to provide the required heat insulation. The inner layer is formed of wear resistant material and has little or no insulating effect. Its thickness is usually about 2½ inches. The combined weight of the two layers and the supports for the inner layer is approximately 50 lbs. per sq. ft. Such wall construction is both expensive and ponderous.

In accordance with our invention, we propose to reduce the required thickness of expensive, high-temperature insulating block, eliminate the said suspended inner layer of facing tile, and reduce the heat flow through the wall by providing a supplementary stagnant wall of the contact material itself. This may be conveniently accomplished by providing a number of elongated horizontally extending plates 18 which may be conveniently supported by rods and brackets 20 and 22, respectively, such plates being upwardly inclined in cross section to form with the insulating block wall 16 a series of pockets which will catch the contact material generally indicated at 24 as it fills the kiln. The plates extend inwardly or laterally. Thereby a facing wall of such material is formed over the inner surface of the wall 16 so that the thickness of the latter may be safely reduced to about 3 inches.

As shown in Figure 2, the contact material may be maintained at a thickness approximately equal to that of the high temperature insulating block lining and, being of an insulating character itself, such as granules of clay or the like, it will serve satisfactorily for heat insulation.

A wall thus formed of the outer block layer 16 and the inner layer of contact material will be much less expensive than the common wall construction previously described herein and will be quite effective for heat insulation. Its weight will also be much less due to reduction in the thickness of the wall 16 and due to the fact that the weight of the contact material is small in comparison with that of standard insulating materials employed in kiln constructions.

When the kiln is emptied of contact material a portion of such material will be retained by the shelves 18, as indicated at the upper portion of Figure 2. This material may remain upon the shelves for the life of the kiln. When the kiln is recharged after emptying, the fresh material introduced will fill the remaining space between the shelves so that during operation of the kiln a certain volume of the contact material will always form a continuous inner wall.

In addition, the utilization of this stagnant wall of contact material serves another important purpose. As the contact material passes downwardly through the kiln it does not abrade the insulating blocks but merely moves down on the wall which is in vertical alignment with the inner edges of the flights or shelves. Probably there will be some intermediate turbulence between flights but for the most part the flow of the contact material will be steady and uniform and without substantial disturbance to the surface wall which is prevented from flowing by the flights. This, therefore, prevents any destruction of the insulating block throughout the life of the apparatus.

While we have shown and described a preferred form of embodiment of our invention, we are aware that modifications can be made therein and, therefore, desire a broad interpretation of our invention within the scope and spirit of the description herein and of the claims appended hereinafter.

We claim:

1. In combination, an open vessel having a structural supporting wall and an insulating lining within the wall, said vessel having an outlet in the lower part thereof and being adapted to receive a continuous flowing mass of a granular material, said vessel having a plurality of vertically spaced inwardly and upwardly extending shelves, said shelves projecting from the lining and forming with the lining a series of shallow upwardly open pockets along the inner surface of the vessel, said pockets being adapted to intercept granular material passing through the vessel whereby said intercepted granular material forms a substantially continuous supplemental lining for the vessel.

2. The combination as claimed in claim 1 in which a plurality of vertically extending supports engage the inwardly extending portion of the shelves and in which means are provided to carry the load of said supports from the supporting wall of the vessel.

3. The combination as claimed in claim 2 in which the vessel is a catalyst regenerating kiln and the shelves have an inwardly extending width to form a supplemental lining of substantially the thickness of the first-mentioned lining.

4. A method of insulating a vertical substantially hollow regenerating kiln through which a hot granular material is adapted to pass and which normally causes attrition and erosion of the insulating lining to a thickness less than the nominal required thickness for the dominating characteristic which comprises providing rows of upwardly and inwardly projecting shelves along the inside wall of the kiln and defining pockets, the vertical spacing being sufficiently close with respect to the inwardly extending width of the pockets that the intercepted granular material will establish a substantially continuous horizontally and vertically extending layer of the granular material which acts as a barrier between the flowing material and the lining of the kiln, passing granular material through said kiln and into said pockets against the insulating lining, and supporting such layer directly from the wall of the kiln in a substantially immovable position.

5. In a vessel containing a vertically elongated chamber wherein a non-turbulent bed of fluent granular solid moves downwardly, which vessel comprises inlet and outlet means for said solids, the combination thereof with means for producing vertically elongated substantially static masses of said solid between the walls of said chamber and said bed, said means comprising a plurality of shelves substantially contiguous to said wall at vertically spaced intervals and adapted to maintain said static masses of solid, said shelves being spaced apart and made rigid by vertical rods within said chamber, said rods extending between and being affixed to adjacent shelves.

WHEATON W. KRAFT.
ARCHIBALD DAVIES.
OTTO C. SCHAUBLE.

REFERENCES CITED

The following references are of record in the file of this patent:

UNITED STATES PATENTS

| Number | Name | Date |
|---|---|---|
| 1,786,732 | Balduf | Dec. 30, 1930 |
| 2,056,732 | Mekler | Oct. 6, 1936 |